United States Patent

Tamagawa et al.

[11] Patent Number: 6,034,495
[45] Date of Patent: Mar. 7, 2000

[54] APPARATUS FOR DETECTING PINCHING OF AN OBJECT IN A POWER WINDOW

[75] Inventors: Kenichi Tamagawa; Yukio Miura, both of Miyagi-ken, Japan

[73] Assignee: Alps Electric Co., Ltd., Tokyo, Japan

[21] Appl. No.: 09/274,824

[22] Filed: Mar. 23, 1999

[30] Foreign Application Priority Data

Mar. 23, 1998 [JP] Japan .................................. 10-074046

[51] Int. Cl.$^7$ ........................................................ B60J 1/16
[52] U.S. Cl. .......................... 318/266; 318/268; 318/466; 318/468; 318/282
[58] Field of Search .................................... 318/260–289, 318/460–470, 455, 447; 361/31, 29; 160/291, 292, 293.1; 49/28, 349; 364/424.05

[56] References Cited

U.S. PATENT DOCUMENTS

| | | | |
|---|---|---|---|
| 5,399,950 | 3/1995 | Lu et al. ................................. | 318/565 |
| 5,410,226 | 4/1995 | Sekiguchi et al. ..................... | 318/266 |
| 5,422,551 | 6/1995 | Takeda et al. .......................... | 318/265 |
| 5,521,473 | 5/1996 | Mizuno et al. ......................... | 318/285 |
| 5,530,329 | 6/1996 | Shigematsu et al. ................... | 318/469 |
| 5,543,693 | 8/1996 | Janca et al. ............................ | 318/283 |
| 5,650,698 | 7/1997 | Ito et al. ................................. | 318/282 |
| 5,663,620 | 9/1997 | Mizuno et al. ......................... | 318/283 |
| 5,689,160 | 11/1997 | Shigematsu et al. ................... | 318/281 |
| 5,723,959 | 3/1998 | Iwata et al. ............................ | 318/447 |
| 5,731,675 | 3/1998 | McCarthy .............................. | 319/469 |
| 5,832,664 | 11/1998 | Tajima et al. .......................... | 318/434 |
| 5,917,299 | 6/1999 | Kumagai et al. ...................... | 318/466 |

*Primary Examiner*—Paul Ip
*Attorney, Agent, or Firm*—Brinks Hofer Gilson & Lione

[57] ABSTRACT

An apparatus for detecting the pinching of an object of a power window which stops the detection of the pinching when a normal pulse edge interval of a two-phase pulse is not obtained is disclosed. The apparatus comprises a motor 4 for opening/closing a window, a motor driving unit 3, a pulse generating unit 5 for generating a two-phase pulse, an MCU 2, and a switching arrangement 1. The MCU 2 detects a motor torque from an interval between pulse edges of the two-phase pulse at the time of opening and closing the window and compares the motor torque with a preset addition value. When the motor torque exceeds the addition value, the MCU 2 determines the occurrence of the pinching of an object and stops or reverses the driving of the motor 4. A timer 14 for resetting time each time the pulse edge in the two-phase pulse arrives is disposed in the MCU 2. When a pulse edge in the two-phase pulse arrives and the next pulse edge does not arrive within the set time of the timer 14, the MCU 2 stops the determination of the presence or absence of the pinching of an object in the window.

2 Claims, 6 Drawing Sheets

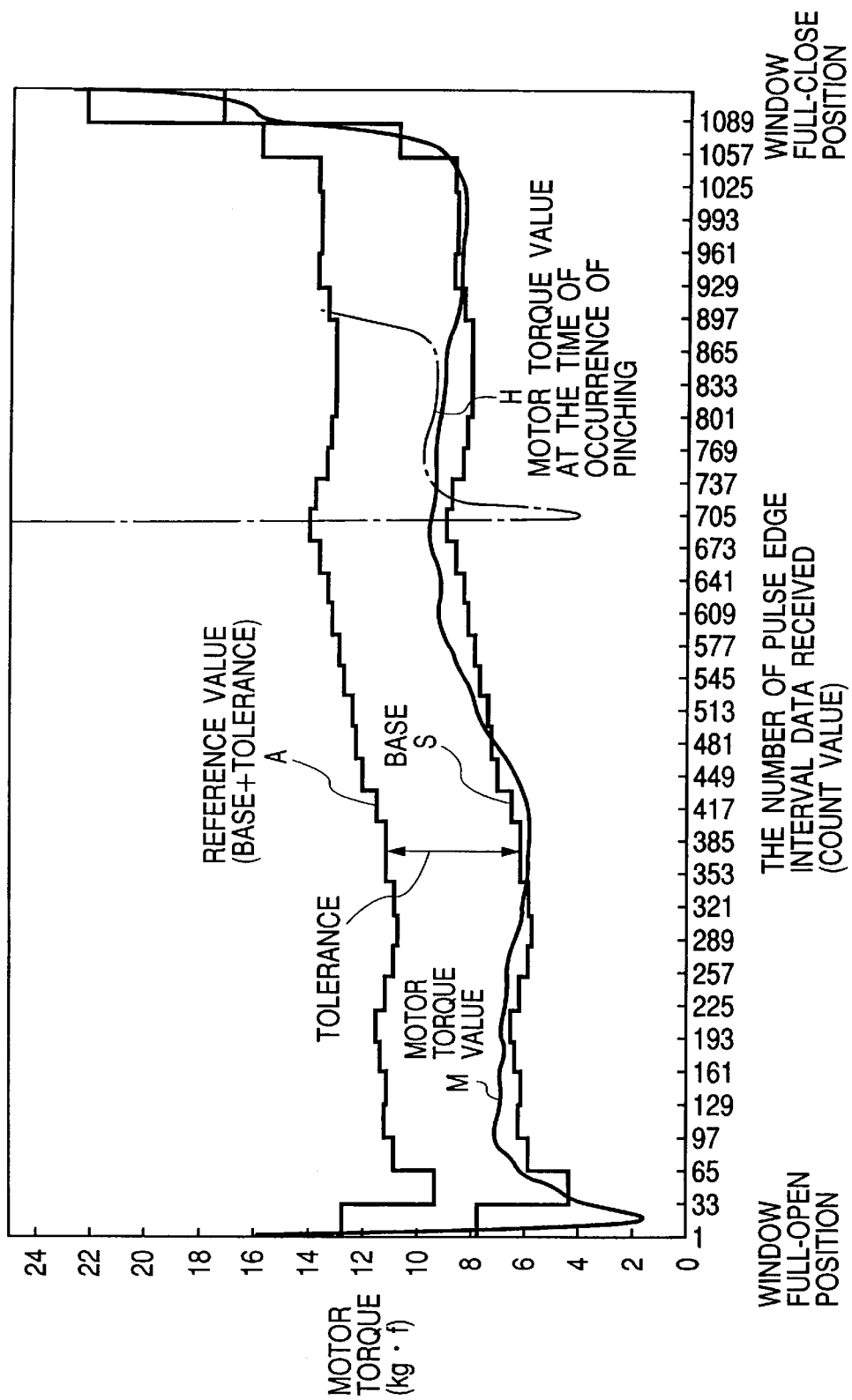

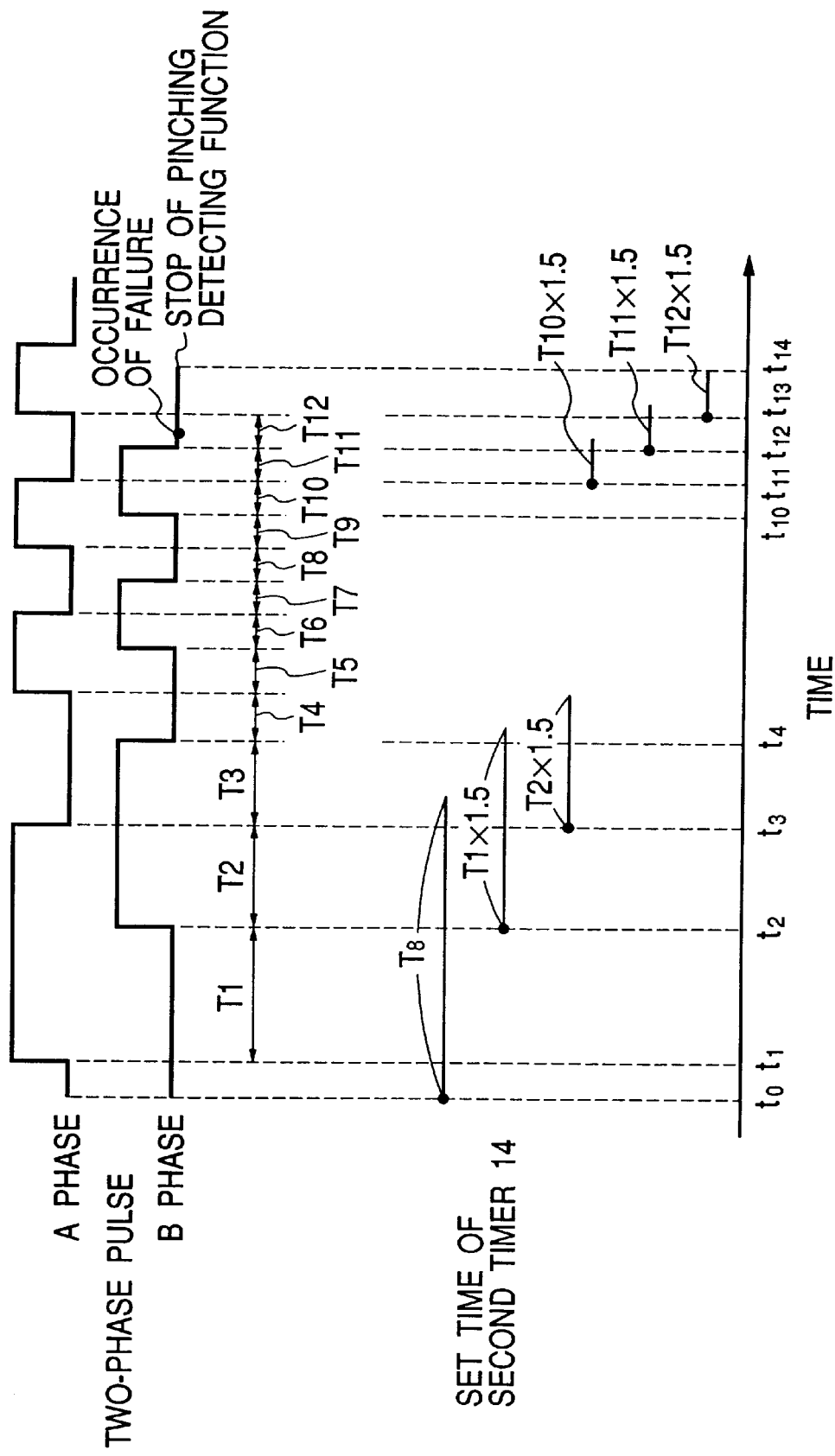

APPARATUS FOR DETECTING PINCHING OF AN OBJECT IN A POWER WINDOW

BACKGROUND OF THE INVENTION

1. Field of the Invention

The present invention relates to an apparatus for detecting pinching of an object of a power window and, more particularly, to a method of detecting the pinching of an object of a power window apparatus, which prevents erroneous detection of the pinching of an object caused when a normal pulse edge interval cannot be detected due to no supply of a two-phase pulse from a pulse generating unit coupled to a motor for opening and closing windows.

2. Description of the Related Art

Hitherto, in order to prevent an object from being pinched in a window and damaged at the time of window closing operation and prevent an excessive load from being applied to a motor used for opening and closing the windows, a power window apparatus for opening and closing the windows of a vehicle, which detects the pinching of an object and either stops the motor or opens the window when occurrence of the pinching of an object is detected is known.

A known power window apparatus which detects the pinching of an object comprises at least a motor for opening and closing windows, a motor driving unit for driving the motor, a pulse generator which is coupled to the motor and generates a pulse when the motor rotates, a microcomputer control unit (MCU) for controlling the whole operation of the apparatus, and an operation switch for opening and closing the windows by manual operation.

The operation of the known power window apparatus which detects the pinching of an object is carried out as follows. When any of switches in the operation switch is operated, a drive signal from the microcomputer control unit is supplied to the motor via the motor driving unit to rotate the motor forward or reverse in accordance with the operated switch and allow the window to be opened or closed. When the motor rotates, the pulse generator coupled to the motor operates and generates a pulse. The microcomputer control unit acquires a pulse edge interval of the pulse generated from the pulse generator by counting clock signals, obtains a motor torque value from the calculated pulse edge interval, and compares the acquired count value with a base value which is preliminarily set in an internal memory. When the motor torque value becomes considerably larger than the base value, occurrence of the pinching of an object in the window is determined and the motor is immediately stopped or rotated in reverse.

According to the known power window apparatus which detects the pinching of an object as mentioned above, in case of opening or closing a window, the motor torque value is obtained on the basis of the pulse edge interval of the two-phase pulse generated from the pulse generator and compared with the base value, thereby determining the presence or absence of the pinching of an object in the window.

According to the known power window apparatus which detects the pinching of an object, in case of opening or closing a window, while a pulse is generated from the pulse generator, the presence or absence of the pinching of an object in the window can be determined on the basis of the pulse edge interval of the pulse. When a failure in a magnetic sensor provided in the pulse generator, a break in a cable through which a pulse generated from the magnetic sensor is led to a microcomputer control unit, a break or contact failure of a cable connector disposed on the pulse generator or microcomputer control unit side, or the like is caused by a some reason during the window opening or closing operation, the pulse is not generated from the pulse generator or not transferred to the microcomputer control unit. When the pulse generated from the pulse generator is not transferred to the microcomputer control unit, the microcomputer control unit cannot obtain either the pulse edge interval or the motor torque value based on the pulse edge interval. Consequently, there is a problem such that even if an object is pinched in the window during the period, the pinching of an object cannot be detected. On the other hand, when the pulse generated from the pulse generator is a two-phase pulse and only one phase in the two-phase pulse is not transferred to the microcomputer control unit, even if the microcomputer control unit can obtain a pulse edge interval, the pulse edge interval becomes about twice as long as the inherent pulse edge interval and the motor torque vehicle based on the pulse edge interval accordingly doubles. Consequently, a problem such that even when an object is not pinched in the window, occurrence of the pinching of an object is erroneously detected.

SUMMARY OF THE INVENTION

The object of the invention is to provide an apparatus for detecting the pinching of an object of a power window, which stops detection of the pinching of an object when a specific pulse edge interval of a pulse generated by a pulse generator is not obtained.

In order to achieve the object of the invention there is provided an apparatus of detecting the pinching of an object of a power window comprising: a motor for opening and closing a window via a window driving mechanism; a motor driving unit for driving the motor; a pulse generating unit for generating pulses corresponding to the rotation of the motor; a microcomputer control unit for performing a whole control driving process; and a switching arrangement for opening and closing the window by manual operation. The microcomputer control unit detects a motor torque value from a pulse edge interval of a pulse generated by the pulse generating unit when the window is opened or closed by driving the motor, compares the detected motor torque value with a base value and an addition value which are preset, determines occurrence of the pinching of an object in the window when the motor torque value exceeds the addition value, and stops or drives the motor in reverse. A timer for resetting a time each time a pulse edge in a pulse arrives is disposed in the microcomputer control unit. When one pulse edge in the pulse arrives and the next pulse edge does not arrive within the set time of the timer, the microcomputer control unit stops the determination of the presence or absence of the pinching of an object in the window.

According to an embodiment of the invention, in an apparatus for detecting the pinching of an object of the power window, when the determination of the presence or absence of the pinching of an object in the window is stopped, the microcomputer control unit moves the window so as to be opened via the motor driving unit.

According to the foregoing embodiments of the invention, the timer is disposed in the microcomputer control unit. In case of opening or closing the window, when a pulse is generated from the pulse generator, each time the pulse edge of the pulse arrives, the set time of the timer is reset so as to be slightly longer than the specific pulse edge interval of the pulse. When it is detected by the timer that the pulse edge interval between arrival of a pulse edge of a pulse and arrival of the next pulse edge has a specific length, only by resetting the timer by the next pulse edge and setting the next time of the timer, the microcomputer control unit can perform detection of the pinching of an object by the power window apparatus as usual. On the contrary, when it is detected by the elapse of the set time of the timer that the pulse edge interval becomes considerably longer than the specific length due to occurrence of a failure or fault in the pulse generator or its output transmission path, the microcomputer control unit immediately stops the detection of the pinching of an object by the power window apparatus. Consequently, occurrence of the pinching of an object is not erroneously determined when nothing is actually pinched.

BRIEF DESCRIPTION OF THE DRAWINGS

FIG. 3 is a characteristic diagram showing an example of a base value and a tolerance value of the motor torque set for each travel region when the whole travel region of a window is divided into 36 travel regions in the power window apparatus shown in FIG. 1;

FIG. 6 is a diagram showing an example of a two-phase pulse and a time setting state of a second timer in the power window apparatus shown in FIG. 1.

DETAILED DESCRIPTION OF THE PREFERRED EMBODIMENTS

Embodiments of the invention will be described hereinbelow with reference to the drawings.

Figure 1:
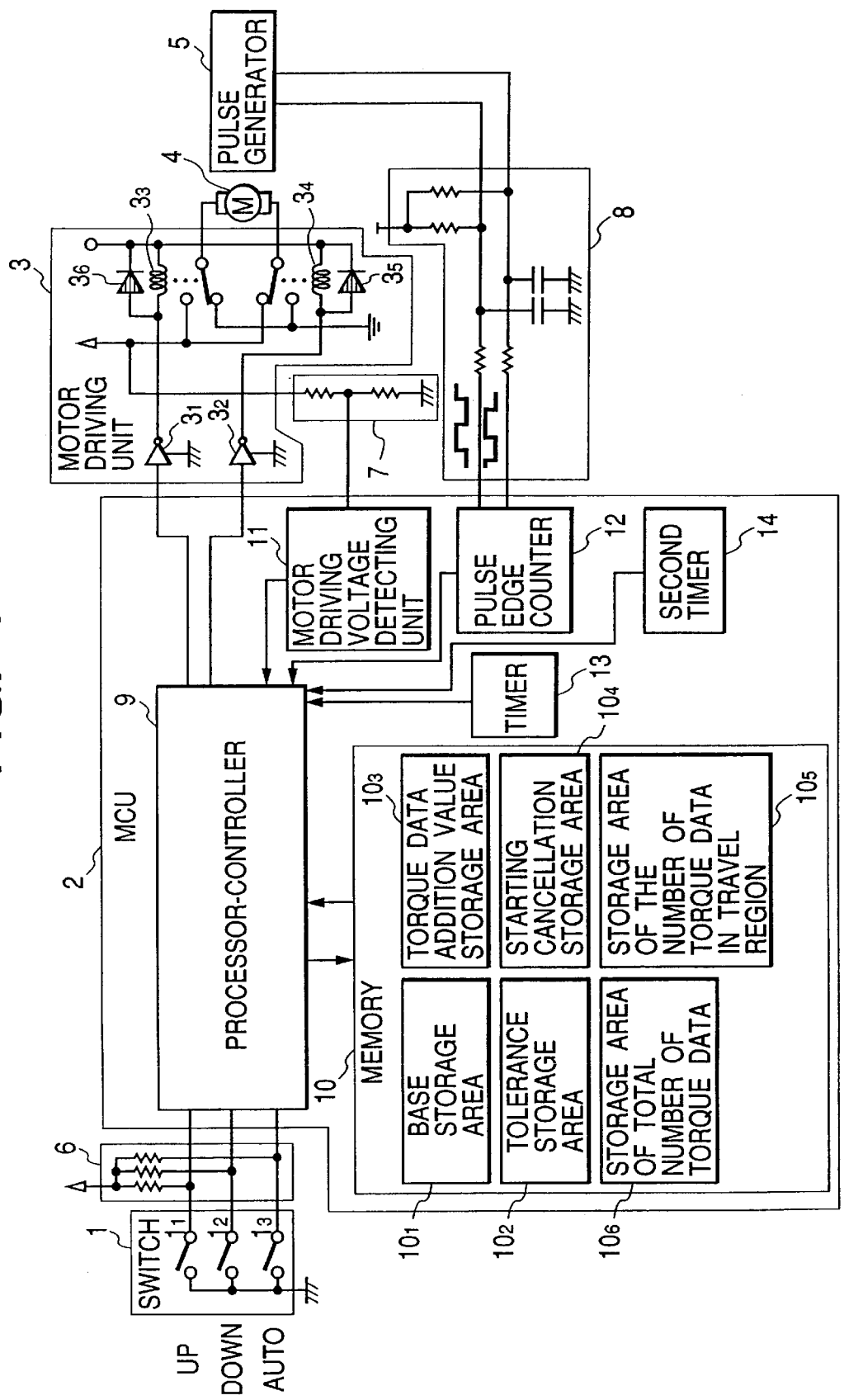
FIG. 1 is a block diagram showing the construction of a power window apparatus for a method of detecting the pinching of an object in the power window according to the invention.

FIG. 1 is a block diagram showing the construction of a power window apparatus for detecting the pinching of an object of the power window according to the invention.

As shown in FIG. 1, the power window apparatus comprises a switching arrangement 1, a microcomputer control unit (MCU) 2, a motor driving unit 3, a motor 4, a pulse generator 5, a pull-up resistor 6, a voltage dividing resistor 7, and a pulse transmission path 8.

Figure 2A:
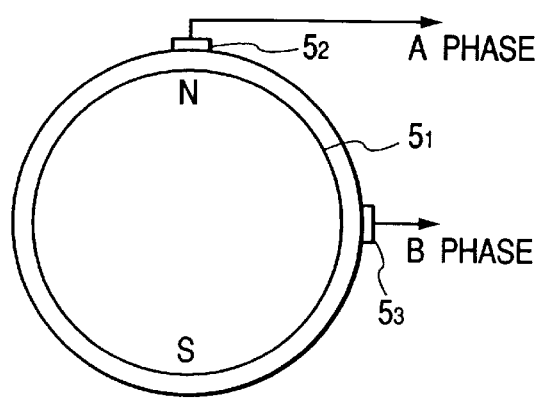
FIG. 2A is a diagram showing the pulse generation principle structure of a pulse generator used in the power window apparatus shown in FIG. 1.
Figure 2B:
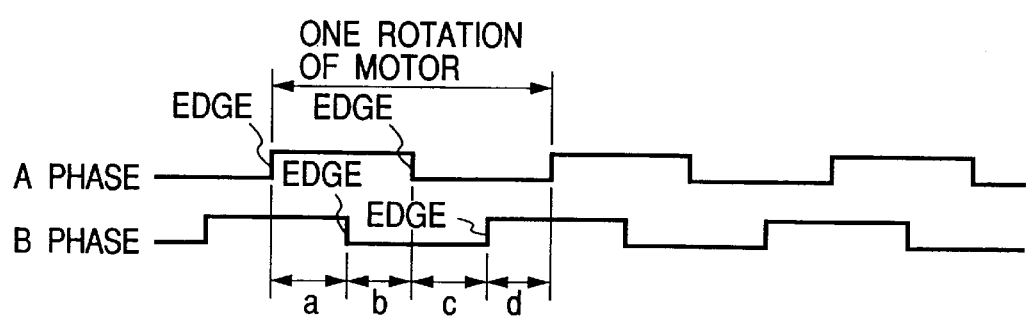
FIG. 2B is a waveform chart showing a two-phase pulse generated from the pulse generator.

FIG. 2A is a diagram showing the pulse generation principle structure of the pulse generator for use in the power window apparatus shown in FIG. 1. FIG. 2B is a waveform chart showing a two-phase pulse generated from the pulse generator at the time of driving the motor.

As shown in FIG. 2A, the pulse generator 5 has a rotator $5_1$ and Hall elements $5_2$ and $5_3$.

The switching arrangement 1 has a window raising switch $1_1$, a window lowering switch $1_2$, and an automatic switch $1_3$ which are individually operated. The window raising switch $1_1$ instructs a window raising (closing) operation. The window lowering switch $1_2$ instructs a window lowering (opening) operation. The window travels in a designated direction only when either the window raising switch $1_1$ or window lowering switch $1_2$ is operated. When the operation of the window raising switch $1_1$ or window lowering switch $1_2$ is stopped, the travel of the window is also stopped. The automatic switch $1_3$ instructs an automatic continuation of the operation. When the automatic switch $1_3$ and the window raising switch $1_1$ are simultaneously operated, the window starts the raising (closing) operation as described above. Even if the operation of the automatic switch $1_3$ and the window raising switch $1_1$ is stopped after that, the window raising (closing) operation continues and is stopped when the window pane reaches the uppermost part of the window frame. When the automatic switch $1_3$ and the window lowering switch $1_2$ are simultaneously operated, the window similarly starts the lowering (opening) operation. Even if the operation of the automatic switch $1_3$ and the window lowering switch $1_2$ is stopped after that, the window lowering (opening) operation continues and is stopped when the window pane reaches the lowermost part of the window frame.

The microcomputer control unit 2 comprises a processor-controller 9, a memory 10, a motor driving voltage detecting unit 11, a pulse edge counter 12, a first timer 13, and a second timer 14. Among the elements, the processor-controller 9 controls the rotating state of the motor 4 via the motor driving unit 3 by generating a control signal corresponding to the operating state of the switching arrangement 1, supplying the control signal to the motor 4 via the motor driving unit 3 to rotate the motor 4, and executing a predetermined data process, data arithmetic operation, and the like on the basis of data supplied from the motor driving voltage detecting unit 11 and the pulse edge counter 12 and data stored in the memory 10. The memory 10 has six storage areas comprising a base value storage area $10_1$, a tolerance value storage area $10_2$, a torque data addition value storage area $10_3$, a starting cancellation storage area $10_4$, a storage area $10_5$ of the number of torque data in a travel region, and a storage area $10_6$ of the total number of torque data. The contents of storage to the six storage areas $10_1$ to $10_6$ will be described hereinlater. The motor driving voltage detecting unit 11 detects a divided voltage indicative of the voltage of a vehicle-mounted power supply (battery) obtained at the voltage dividing point of the voltage dividing resistor 7. The pulse edge counter 12 detects pulse edges of a two-phase pulse supplied from the pulse generator 5. The first timer 13 sets the time when various data processes are executed in the processor-controller 9 and measures the time interval. The second timer 14 is reset each time the pulse edge arrives at the pulse edge counter 12. A new time namely, the interval between arrival of one pulse edge and the arrival of the next pulse edge is set to be slightly longer than the normal pulse edge interval obtained at that time, for example, by about 50%, is set.

The motor driving unit 3 has two inverters $3_1$ and $3_2$ for inverting a control signal, two relays $3_3$ and $3_4$ for switching the rotation of the motor to forward rotation, reverse rotation, or stopping the rotation, and two diodes $3_5$ and $3_6$ for preventing occurrence of a spark. The motor driving unit 3 rotates the motor 4 in accordance with the state of the control signal supplied from the microcomputer control unit 2.

The rotation shaft of the motor 4 is connected to the windows of the vehicle via a window driving mechanism (not shown). For example, the motor 4 so operates as to close the window at the time of the forward rotation and open it at the time of reverse rotation.

The pulse generator 5 is directly attached to the motor 4. As shown in FIG. 2A, it is attached to the rotation shaft of the motor 4. The pulse generator 5 has the rotator $5_1$ on which south and north poles are polarized so as to face each other in the circumferential part and the Hall elements $5_2$ and $5_3$ arranged near the circumferential part of the rotator $5_1$ to generate two-phase pulses having a phase difference of 90° when the motor 4 rotates. When the motor 4 rotates, the rotator $5_1$ simultaneously rotates by the rotation of the motor 4. As shown in FIG. 2B, the two Hall elements $5_2$ and $5_3$ detect the polarized parts of the rotator $5_1$ and generate two-phase pulses having a deviation of a ¼ cycle. One cycle of the pulse is obtained when the motor 4 rotates once.

The pull-up resistor 6 has three resistors connected to the outputs of the switching arrangement 1, the inputs of the microcomputer control unit 2, and the power supply (for example, 8V), respectively. The pull-up resistor 6 supplies a power voltage (for example, 8V) to the inputs of the microcomputer control unit 2 when the window raising switch $1_1$, window lowering switch $1_2$, and automatic switch $1_3$ are not operative.

The voltage dividing resistor 7 comprises two resistors which are serially connected between the vehicle-mounted power supply (battery) and the ground and the connection point of the two resistors is connected to the motor driving voltage detecting unit 11 in the microcomputer control unit 2.

The pulse transmission path 8 comprises two pull-up resistors connected between the outputs of the pulse generator 5 and the power supply (for example, 8V), capacitors connected between the outputs of the pulse generator 5 and the ground, and two serial resistors connected between the outputs of the pulse generator 5 and the inputs of the pulse edge counter 12 in the microcomputer control unit 2. The two-phase pulse generated from the pulse generator 5 is transmitted to the pulse edge counter 12 through the pulse transmission path 8.

When the motor 4 rotates to open or close the window, the two-phase pulse generated by the pulse generator 5 is supplied via the pulse transmission path 8 to the microcomputer control unit 2. The pulse edge counter 12 detects the pulse edges (leading and trailing edges) of the two-phase pulse and supplies the processor-controller 9 an edge detection signal each time the pulse edge arrives. The processor-controller 9 counts the supply timing of the pulse edge detection signal by the first timer 13 to measure an arrival time interval (hereinbelow, referred to as edge interval data) between a pulse edge detection signal and the subsequent pulse edge detection signal. The pulse edge interval data is obtained every ¼ rotation of the motor 4.

In the power window apparatus shown in FIG. 1, in order to detect the presence or absence of the pinching of an object in the window, motor torque values when the window is opened and closed are used as detection parameter values. The motor torque values are calculated from the pulse edge interval data. The motor torque value includes the weight of the window, a frictional force between the window and the sash, and the like in practice. In the power window apparatus shown in FIG. 1, a plurality of travel regions obtained by dividing the whole travel region of the window (effective travel region between the full-open position and the full-close position) on the basis of the count value derived by counting the number each time the pulse edge interval data arrives are set. A base value and a tolerance value are preset for each travel region.

FIG. 3 is a characteristic diagram showing an example of the base value and the tolerance value of the motor torque value which are set for each travel region when the whole travel region of the window is divided into 36 travel regions in the power window apparatus shown in FIG. 1.

In FIG. 3, the vertical axis shows the motor torque and the lateral axis shows the count number obtained by counting the number each time the pulse edge interval data arrives when the window travels from the full-open position to the full-close position. The lower stair-like characteristic (S) shows the base value of the motor torque. The upper stair-like characteristic (A) indicates the reference value (base value+tolerance value) of the motor torque. The solid line (M) is a curve of the motor torque when no object is pinched in the window. The alternate long and short dash line (H) is a curve of the motor torque when an object is pinched in the window.

The base value of the motor torque shown in FIG. 3 is a motor torque value necessary to move the window when there is no substantial pinching of an object in the window and determined on the basis of the motor torque value measured when there is no pinching of an object. The base value is updated to a new value each time the window travels, that is, "learned". As will be described later, the motor torque is calculated from the pulse edge interval data and the motor driving voltage. The pulse edge interval data is obtained each time the motor 4 rotates ¼. When the window travels the effective travel region from the full-open position to the full-close position, that is the 36 travel regions, since 32 pulse edge interval data are obtained from each travel region, about 1200 pulse edge interval data are obtained in total. Data of the motor torque of the same number are therefore obtained.

The tolerance value in the motor torque shown in FIG. 3 is a constant value irrespective of the position of the window in the travel regions and generally determined according to a standard or the like. A value obtained by converting the maximum permissible force which can be applied to an object pinched in the window into a motor torque or a value obtained by performing some correction to the above obtained value is used as the tolerance value. The reference value is obtained by adding the tolerance value to the base value. The pinching of an object is determined by comparing the value with the present motor torque value.

In the power window apparatus shown in FIG. 1, operation as shown below is executed.

When one of the switches in the switching arrangement 1, for example, the window raising switch $1_1$ is operated, the input of the microcomputer control unit 2 connected to the window raising switch $1_1$ is changed from the potential of 8V to the ground potential. At this moment, the processor-controller 9 in the microcomputer control unit 2 supplies the motor control unit 3 a control signal to forwardly rotate the motor 4 in response to the supplied ground potential. The motor control unit 3 switches the two relays $3_3$ and $3_4$ in response to the control signal and forwardly rotates the motor 4. When the motor 4 rotates forward, the motor control unit 3 moves the window in the closing direction via the window driving mechanism connected to the motor 4. By the rotation of the motor 4, the pulse generator 5 attached to the motor 4 generates the two-phase pulse and the generated two-phase pulse is supplied via the pulse transmission path 8 to the pulse edge counter 12 in the microcomputer control unit 2.

When the operation of the window raising switch $1_1$ is stopped, the input of the microcomputer control unit 2 connected to the window raising switch $1_1$ is changed from the ground potential to the 8V potential. At this moment, the processor-controller 9 supplies the motor control unit 3 the control signal to stop the rotation of the motor 4 in response to the supplied 8V potential. The motor control unit 3 switches the two relays 3₃ and 3₄ in response to the control signal to stop the supply of the power to the motor 4, thereby stopping the rotation of the motor 4. When the rotation of the motor 4 is stopped, the operation of the window driving mechanism connected to the motor 4 is stopped and the window is stopped at the present position. When the rotation of the motor 4 is stopped, the pulse generator 5 attached to the motor 4 stops the generation of the two-phase pulse, so that the two-phase pulse is not supplied to the pulse edge counter 12.

When another switch in the switching arrangement 1, for example, the window lowering switch 1₂ is operated, in a manner similar to the foregoing case, the input of the microcomputer control unit 2 connected to the window lowering switch 1₂ is changed to the ground potential. At this moment, the processor-controller 9 in the microcomputer control unit 2 supplies the motor control unit 3 a control signal to rotate the motor 4 in reverse in response to the supplied ground potential. The motor control unit 3 switches the two relays 3₃ and 3₄ in response to the control signal to rotate the motor 4 in reverse. When the motor 4 rotates in reversely, the motor control unit 3 opens the window via the driving mechanism connected to the motor 4. In this case as well, when the motor 4 rotates, the pulse generator 5 attached to the motor 4 generates the two-phase pulse, and the generated two-phase pulse is supplied via the pulse transmission path 8 to the pulse edge counter 12.

After that, when the operation of the window lowering switch 1₂ is stopped, the input of the microcomputer control unit 2 connected to the window lowering switch 1₂ is changed from the ground potential to the 8V potential. At this moment, the processor-controller 9 supplies the motor control unit 3 a control signal to stop the rotation of the motor 4 in response to the received 8V potential. The motor control unit 3 switches the two relays 3₃ and 3₄ in response to the control signal to stop the supply of the power to the motor 4, thereby stopping the rotation of the motor 4. When the rotation of the motor 4 is stopped, the operation of the window driving mechanism connected to the motor 4 is stopped and the window stops travelling at the present position. When the rotation of the motor 4 is stopped, the pulse generator 5 attached to the motor 4 also stops the generation of the two-phase pulse, so that no two-phase pulse is supplied to the pulse edge counter 12.

With respect to the operation when the window raising switch 1₁ and the automatic switch 1₃ are simultaneously operated and the operation when the window lowering switch 1₂ and the automatic switch 1₃ are simultaneously operated, an operation almost like the above-described operation or operation according to each of the above-mentioned operations is performed.

Figure 4:
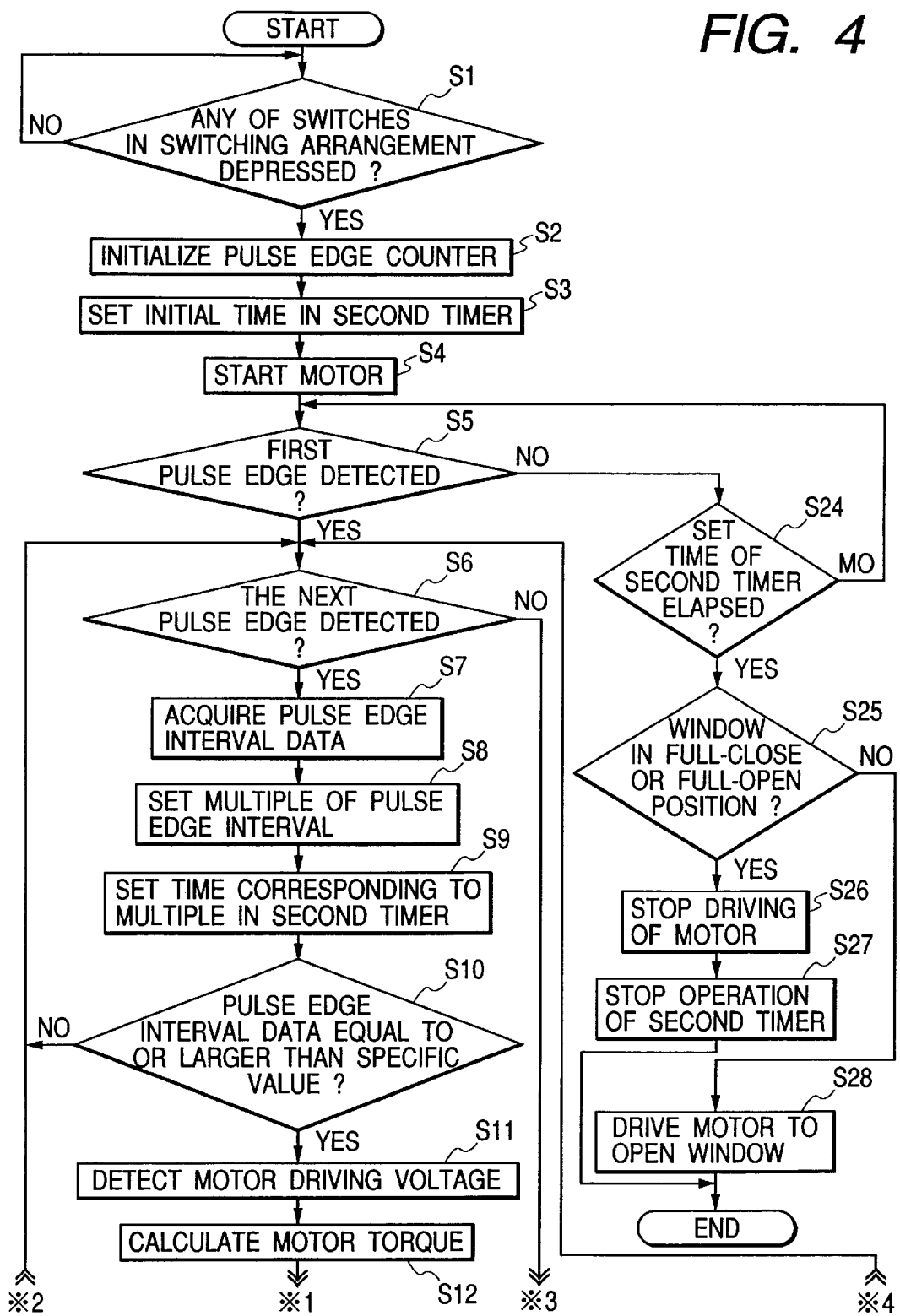
FIG. 4 is a part of a flowchart showing the flow of a detailed operation including detection of the pinching of an object in the window at the operating time of the power window apparatus shown in FIG. 1.
Figure 5:
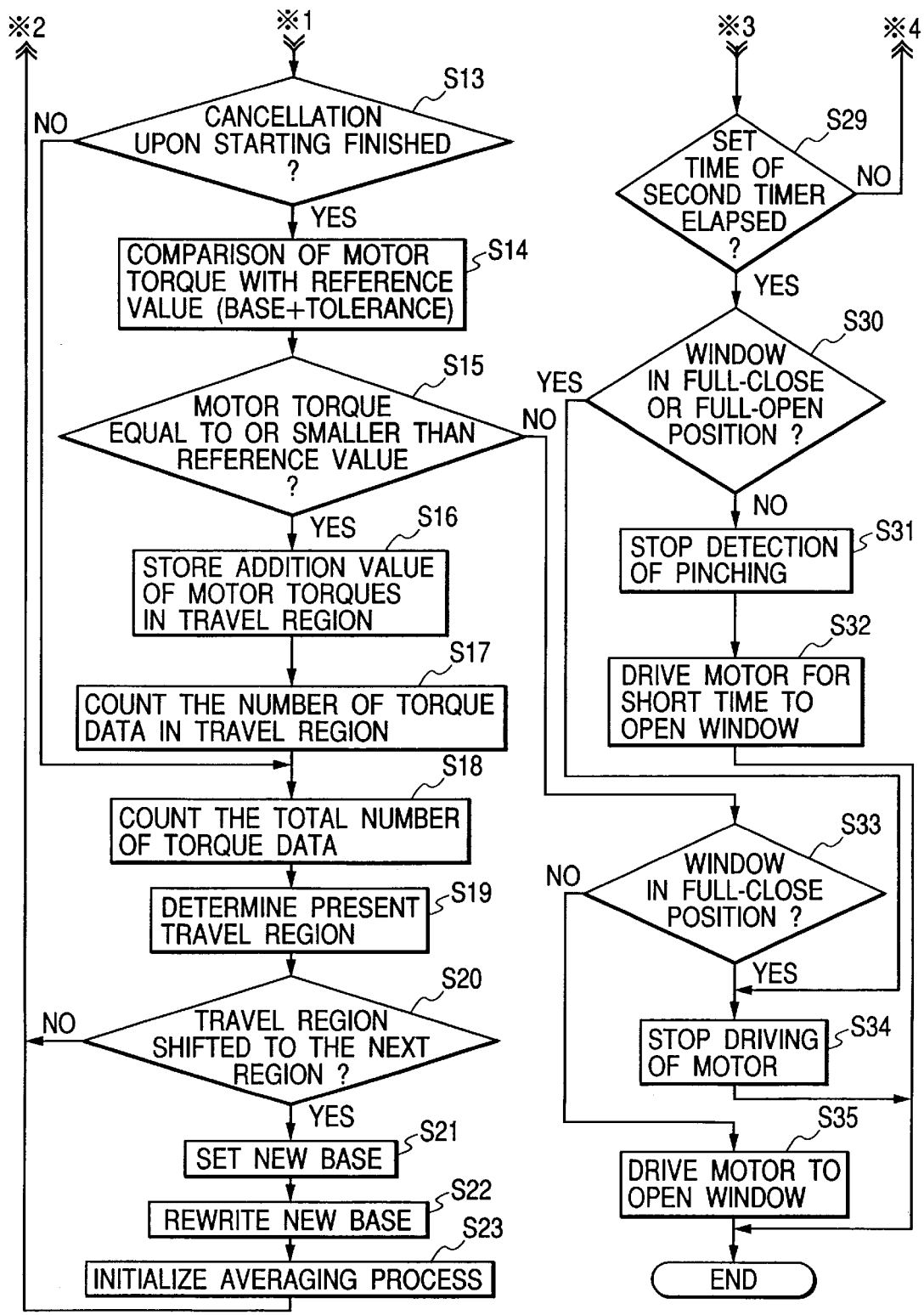
FIG. 5 is the remaining part of the flowchart showing the flow of the detailed operation including the detection of pinching of an object in the window at the operating time of the power window apparatus shown in FIG. 1.

FIGS. 4 and 5 are flowcharts showing the process of the detailed operation including detection of the pinching of an object in the window at the time of operation as described above in the power window apparatus shown in FIG. 1.

The process of the detailed operation of the power window apparatus shown in FIG. 1 will be described as follows with reference to the flowcharts shown in FIGS. 4 and 5.

In step S1, the processor-controller 9 in the microcomputer control unit 2 determines which one of the window raising switch 1₁, window lowering switch 1₂, and automatic switch 1₃ in the switching arrangement 1 is operated (depressed). When it is determined that any of the switches 1₁, 1₂, and 1₃ is operated (Y), the operation of the routine advances to step S2. On the other hand, when it is determined that any of the switches 1₁, 1₂, and 1₃ is not operated (N), the operation of step S1 is repeatedly executed.

In step S2, the processor-controller 9 erases the counter contents and initializes the pulse edge counter 12.

In step S3, the processor-controller 9 sets the initial time in the second timer 14. The initial time is considerably longer than a time which will be set later in the second timer 14.

In step S4, the processor-controller 9 drives the motor 4 via the motor driving unit 3 to start the motor 4.

In step S5, the processor-controller 9 determines whether or not the pulse edge counter 12 has detected the first pulse edge of a two-phase pulse supplied from the pulse generator 5. If it is determined that the first pulse edge has been detected (Y), the counting by the first timer 13 is started and the routine advances to step S6. On the other hand, when it is determined that pulse edge has not been detected yet (N), the routine progresses to step S24.

In step S5, whether the motor 4 has started rotation or not after depression of the switch 1 is checked by detecting the first pulse edge. When the first pulse edge is detected, it can be determined that the motor 4 starts the rotation normally.

In step S6, the processor-controller 9 determines whether or not the pulse edge counter 12 has detected the next pulse edge of the two-phase pulse supplied from the pulse generator 5. When it is determined that the next pulse edge has been detected (Y), the routine advances to the next step S7. On the other hand, when it is determined that the next pulse edge has not been detected yet (N), the routine advances to step S29.

Step S6 is a step to confirm the continuation of rotation of the motor 4 by detecting the next pulse edge. When the next pulse edge is detected, it can be determined that the motor 4 continues the rotation.

In step S7, when the pulse edge counter 12 detects the pulse edges, the processor-controller 9 acquires pulse edge interval data indicative of a pulse edge interval between the preceding present pulse edge and the pulse edge by the first timer 13.

In step S8, the processor-controller 9 sets a multiple of the pulse edge interval obtained in step S7, for example, 1.5 times of the pulse edge interval.

In step S9, the processor-controller 9 immediately sets a time corresponding to a value which is 1.5 times as long as the pulse edge interval between the immediately preceding pulse edge calculated in step S8 and the pulse edge of the present time in the second timer each time the pulse edge is detected.

In step S10, the processor-controller 9 determines whether the acquired pulse interval data is equal to or longer than a specific time (for example, 3.5 msec) or not, that is, normal pulse edge interval data or noise. When it is determined that the pulse edge interval data is equal to or longer than the specific time (Y), the routine advances to the next step S11. When it is determined that the value of the edge interval data is shorter than the specified time, that is, noise (N), the routine is returned to step S6 and the operations of step S6 and subsequent steps are repeatedly executed. In this case, when noise is included in the pulse edge interval data, the pulse edge interval data is determined to be normal.

In step S11, the processor-controller 9 acquires a divided voltage detected by the voltage dividing resistor 7 in the motor driving voltage detecting unit 11 as a motor driving voltage E.

In step S12, the processor-controller 9 executes an arithmetic operation by using the acquired motor driving voltage E and pulse edge interval data Pw, thereby calculating a motor torque Tc. In this case, the motor torque Tc is calculated based on the following equation (1).

Equation 1

$$Tc = \left\{\left(kt \cdot \frac{E}{Rm}\right) - Tm\right\} - \frac{ke \cdot kt}{Rm \cdot Pw} \quad (1)$$

where,

Tc: motor load torque

E: motor driving voltage kt: motor torque coefficient

Rm: motor wire wound resistance

Ke: motor generation coefficient

Pw: edge interval data

Tm: motor internal torque

In step S13, the processor-controller 9 determines whether the operation upon starting of the motor 4 has been terminated or not, that is, whether cancellation upon starting has been terminated or not. When it is determined that the operation upon starting has been terminated (Y), the routine advances to the next step S14. On the other hand, when it is determined that the operation upon starting has not been terminated yet (N), the routine advances to step S18.

Whether or not the operation upon starting of the motor 4 is terminated is determined by the following reason. Since the internal torque of the motor 4 is at a changing stage from the maximum state to the stationary state when the motor 4 is started, if detection of the pinching of an object is performed on the basis of the motor torque value measured at this time, the pinching of an object in the window is erroneously determined by a large motor load torque value measured. When the large motor torque value is used to update the base value, a new base value is set to be an erroneous value which does not match the current state.

In this case, whether the operation upon starting the motor 4 has been terminated or not is determined based on a period of time from the detection of the first pulse edge until detection of a predetermined number of pulse edges. In the case where the operation upon starting of the motor 4 has not been terminated, the fact is stored in the starting cancellation storage area $10_4$ in the memory 10.

In step S14, the processor-controller 9 compares the motor torque calculated in step S12 with a reference value obtained by adding the base value and the tolerance value. In this case, the base value is a value preliminarily set for each of all of travel regions of the window and stored in the base value storing area $10_1$ in the memory 10. The tolerance value is a constant value preset for each of all of the travel regions of the window irrespective of the travel region and stored in the tolerance value storage area $10_2$ in the memory 10.

In step S15, the processor-controller 9 determines whether the motor torque is smaller than the reference value or not. The motor torque and the reference value have been compared with each other in step S14. When it is determined that the motor torque is smaller than the reference value (Y), the routine advances to step S16. On the other hand, when it is determined that the motor torque is not smaller than the reference value (N), the routine advances to step S33.

When an increase in the motor torque is detected in step S15, there is the possibility that pinching of an object occurs. Consequently, further investigation is performed in step S33 and subsequent steps.

In step S16, in order to obtain an addition value of all of motor torque values detected in the travel region in which the window is travelling, the processor-controller 9 adds the motor torque data and stores the resultant value in the torque data addition value storing area $10_3$ in the memory 10.

In step S17, in order to count the number of motor torque detected in the travel region in which the window is travelling, the processor-controller 9 adds "1" to the number of torque data in the travel region stored in the storage area $10_5$ of the number of torque data within the travel region in the memory 10 and stores the obtained value.

In step S18, in order to count the total number of all of the motor torque values obtained from the full-open position of the window to the travel region in which the window is travelling at present, the processor-controller 9 adds "1" to the total number of torque data stored in the storage area $10_6$ of the total number of torque data in the memory 10 and stores the resultant value.

In step S19, the processor-controller 9 determines the travel region in which the window is located at present on the basis of the total number of torque data stored in the storage area $10_6$ of the total number of torque data.

In step S20, the processor-controller 9 determines whether the present travel region of the window has changed to the next travel region or not on the basis of the determination of step S19. When it is determined that the travel region of the window has changed to the next travel region (Y), the routine advances to step S21. On the other hand, when it is determined that the travel region of the window has not been changed yet to the next travel region (N), the routine is returned to step S6 and the operations of step S6 and subsequent steps are repeatedly executed.

In step S21, the processor-controller 9 sets a new base value for the immediately preceding travel region on the basis of the motor torque value obtained in the immediately preceding travel region. The new base value is set by using the average value of the obtained motor torque values. The torque data addition value stored in the torque data addition value storage area $10_3$ in the memory 10 is read, the number of torque data in the travel region stored in the storage area $10_5$ of the number of torque data in the travel region is read, and the torque data addition value is divided by the read number of torque data in the travel region, thereby obtaining the new base value.

In step S22, the processor-controller 9 updates the base value written in the base value storage area $10_1$ in the memory 10 to the base value newly set in step S21.

In step S23, the processor-controller 9 initializes the torque data addition value storage area $10_3$ and the storage area $10_5$ of the number of torque data in the travel region in the memory 10, which are used to obtain the average value of the motor torque values. After completion of the initialization, the routine is returned to step S6 and the operations of step S6 and subsequent steps are repeatedly executed.

Steps S13 to S23 are steps to learn and update the base value.

The operations in the flowchart are repeated until: the driving of the motor 4 is stopped by the operation of the window raising switch $1_1$, the window lowering switch $1_2$, or the like to stop the travel of the window; the pinching of an object in the window is detected in step S25 which will be described later, so that the driving of the motor 4 is stopped to stop the travel of the window; or the motor 4 is rotated in reverse and the direction of the travel of the window is changed to the other direction.

Steps S24 to S28 are steps to detect occurrence of a failure in the apparatus or the pinching of an object immediately after depression of the switch 1. Whether the rotation of the motor 4 is started or not within a predetermined time set in the second timer 14 after the depression of the switch 1 is monitored. When the rotation of the motor 4 is not started within the predetermined time, a check is made to see if the window is fully opened or closed, that is, if the window cannot be moved further. When the window is not in the full-open or full-close state, occurrence of a failure in the power window apparatus or occurrence of the pinching is determined and a process is executed. Failures in the power window apparatus are such that the motor 4 does not rotate due to a failure in the motor driving unit 3, a failure occurs in the pulse generating unit 5 or the pulse transmission path 8, and the like.

In step S24, the processor-controller 9 determines whether the time set in the second timer 14 has elapsed or not after the detection of the first pulse edge. When it is determined that the time set in the second timer 14 has elapsed (Y), the routine advances to the next step S25. On the other hand, when it is determined that the time set in the second timer 14 has not elapsed yet (N), the routine is returned to step S5 and the operations of step S5 and subsequent steps are repeatedly executed.

In step S25, the processor-controller 9 determines whether the window is in the fully closed position (full-close position) or fully opened position (full-open position). When it is determined that the window is in the full-close position or full-open position (Y), the routine advances to the next step S26. On the other hand, when it is determined that the window is in a position other than the full-close and full-open positions (N), the routine advances to step S28.

In step S26, when the window is in the full-close position or the full-open position, the processor-controller 9 supplies the motor driving unit 3 a drive stop signal to stop the driving of the motor 4.

Following the motor drive stopping operation, in step S27, the processor-controller 9 stops the counting operation of the second timer 14, thereby to terminate the series of operations.

In step S28, when the window is in a position other than the full-close and full-open positions, the processor-controller 9 supplies the motor driving unit 3 a drive signal to drive the motor 4 in the direction of opening the window.

The following steps 29 to 34 are steps to detect a failure in the apparatus when the window is travelling and execute a process.

In step S29, when the next pulse edge has not been detected yet, the processor-controller 9 determines whether the time set in the second timer 14 has elapsed from the detection of the first pulse edge or not. When it is determined that the time set in the second timer 14 has elapsed (Y), the routine advances to step S30. On the other hand, when it is determined that the time set in the second timer 14 has not elapsed yet (N), the routine is returned to step S6 and the operations of step S6 and subsequent steps are repeatedly executed.

In step S30, the processor-controller 9 determines whether the window is in the fully closed position (full-close position) or fully opened position (full-open position). When it is determined that the window is in a position other than the full-close and full-open positions (N), the routine advances to the next step S31. On the other hand, when it is determined that the window is in the full-close or full-open position (Y), the routine advances to step S33.

In step S31, the processor-controller 9 regards that a failure or fault occurs in either the pulse generating unit 5 or the pulse supplying path and stops the function of detecting the pinching of an object in the window.

In step S32, the processor-controller 9 assumes the possibility that an object has been already pinched in the window and supplies the motor driving unit 3 a drive signal for a short time, for example, only 500 msec to drive the motor 4 in the direction of opening the window.

When the detection of the pinching is stopped in step S31, by using a proper means, the driver of the vehicle is notified of the occurrence of a failure in the pinching detecting part in the power window apparatus and stop of the detection of the pinching of the power window apparatus. As an example of the notifying means, a warning lamp assembled in the dash panel is used. When there is warning by the warning lamp, the failure has to be repaired in accordance with the warning and the driver has to operate the switch 1 while visually checking the safety and taking into consideration that the detection of the pinching is stopped at the time of opening and closing the window until the repair of the failure is terminated.

In step S33, when the motor torque is larger than the addition value, the processor-controller 9 determines whether the window is in the fully closed position (full-close position) or not. When it is determined that the window is in the full-close position (Y), the routine advances to the next step S34. On the other hand, when it is determined that the window is in a position other than the full-close position (N), the routine advances to step S35.

In step S34, the processor-controller 9 regards that no object is pinched in the window and supplies the motor driving unit 3 a drive stopping signal to stop the driving of the motor 4.

In step S35, the processor-controller 9 assumes that the pinching of an object in the window has already occurred, supplies the motor driving unit 3 a drive signal to drive the motor 4 in the direction of opening the window, and terminates the series of operations.

According to an apparatus for detecting the pinching of an object in the power window of the embodiment as mentioned above, the operations according to the flowcharts shown in FIGS. 4 and 5 are performed. When the window travels from the full-open position to the full-close position and nothing is pinched in the window during the travel, the characteristic as shown by the solid line (M) in FIG. 3 is obtained as a motor torque value. In all of the window travel regions, the motor torque value does not exceed the reference value (which is the addition value of the base value and the tolerance value) set for each travel region.

On the contrary, when the window travels from the full-open position to the full-close position and an object is pinched in the window during the travel, the characteristic as shown by an alternate long and short dash line in FIG. 3 is obtained as a motor torque value. The motor torque value in the travel region where an object is pinched exceeds the reference value (addition value of the base value and the tolerance value) set for the travel region. In this case, the processor-controller 9 switches the two relays $3_3$ and $3_4$ by supplying a control signal to the motor control unit 3 to stop the rotation of the motor 4, thereby stopping the travel of the window, or reversely rotating the motor 4 in reverse to change the direction of the travel of the window. In such a manner, the object pinched in the window is protected from being damaged.

According to an apparatus for detecting the pinching of an object of the power window of the embodiment, when a failure or fault occurs in either the pulse generating unit 5 or the pulse supplying path during the operations according to the flowcharts shown in FIGS. 4 and 5 and the pulse edge interval becomes larger than the specific pulse edge interval, the processor-controller 9 immediately stops the function of detecting the pinching of an object in the window. Consequently, erroneous determination of detecting occurrence of the pinching when nothing is pinched in the window can be prevented.

FIG. 6 is a diagram for showing an example of the two-phase pulse and the time setting state of the second timer in the power window apparatus illustrated in FIG. 1.

In FIG. 6, the lateral axis denotes time. The waveform at the upper stage shows two-phase pulses generated by the pulse generating unit 5 and the lateral lines at the lower stage denote the set time of the second timer 14.

The relation between the two-phase pulse supplying state and the time setting state of the second timer will now be described with reference to FIG. 6.

At time $t_0$, the second timer 14 is set, the motor 4 is simultaneously started, and the pulse generating unit 5 is made active. At this moment, time TB which is relatively long time and longer than, for example, time from the time $t_0$ to time $t_3$ which will be described hereinlater is set for the following reason. Since the motor 4 is relatively slowly started, time until the generation of the first pulse is long.

At time $t_1$, the A-phase pulse in the two-phase pulse rises and the first pulse edge arrives. The pulse edge is detected in step S6 of the flowchart.

At time $t_2$ after elapse of time T1 from the time $t_1$, the B-phase pulse in the two-phase pulse rises and the next pulse edge arrives and is detected in step S6 of the flowchart. In step S7, time (T1×1.5) which is 1.5 times as long as the time T1 is set in the second timer 14.

At the time $t_3$ after elapse of time T2 from the time $t_2$, the A-phase pulse in the two-phase pulse falls and the next (third) pulse edge arrives. In this instance, time (T2×1.5) which is 1.5 times as long as the time T2 is set in the second timer 14.

Similarly, at time $t_{11}$, the A-phase pulse in the two-phase pulse falls and the pulse edge arrives. In this instance, time (T10×1.5) which is 1.5 times as long as time T10 (time from time $t_{10}$ to time $t_{11}$) is set in the second timer 14.

At time $t_{12}$ after elapse of time T11 from the time $t_{11}$, the B-phase pulse in the two-phase pulse falls and the pulse edge arrives. In this instance, time (T11×1.5) which is 1.5 times as long as the time T11 is set in the second timer 14.

At time $t_{13}$ after elapse of time T12 from the time $t_{12}$, the A-phase pulse in the two-phase pulse rises and the pulse edge arrives. In this instance, time (T12×1.5) which is 1.5 times as long as the time T12 is set in the second timer 14.

As will be obviously understood from FIG. 6, the time set in the second timer 14 is a value which is 1.5 times as long as the time interval between the immediately preceding pulse edge and the pulse edge arrived this time. When the arrival interval between the pulse edges in the two-phase pulse is relatively long as that immediately after the start of the motor 4, the time set in the second timer 14 is long. When the arrival interval between the pulse edges of the two-phase pulse is relatively short as that in the steady time, the time set for the second timer 14 is also short.

When both the pulse generating unit 5 and the pulse transmission path 8 of the two-phase pulse are normal, an interval between the arrival of a pulse edge and that of the next pulse edge, namely, the pulse edge interval is shorter than the time set in the second timer 14. Consequently, the set time of the second timer 14 does not elapse within the pulse edge interval, so that the power window apparatus used for the embodiment normally detects the pinching of an object in the window.

On the contrary, when either the pulse generating unit 5 or the pulse transmission path 8 of the two-phase pulse is abnormal, for example, if it is assumed that a failure occurs in the B-phase pulse side and the pulse edge does not arrive before the time T12 elapses, the time set in the second timer 14 elapses within time (T12×1.5) from time $t_{13}$, that is, the pulse edge interval from the arrival of the rising pulse edge of the A-phase pulse until the arrival of the trailing pulse edge of the A-phase pulse. In this case, when the elapse of the set time of the second timer 14 is detected, the processor-controller 9 immediately stops the function of detecting the pinching of an object in the window. Thereafter, the power window apparatus used in the embodiment does not detect the pinching of an object in the window.

Although the example shown in FIG. 6 relates to the case where the pulse edge of the B-phase pulse in the two-phase pulse does not arrive, the invention can be similarly applied to the case where the pulse edge of the A-phase pulse in the two-phase pulse does not arrive and the case where pulse edges of both A and B phase pulses of the two-phase pulse do not arrive.

Although the time which is 1.5 times as long as the time interval between the immediately preceding pulse edge and the pulse edge arrived this time is chosen as the time set in the second timer 14 in the example shown in FIG. 6, the multiple is not limited to 1.5. Arbitrary multiple can be chosen from the range from 1.2 times to 1.8 times.

As mentioned above, according to the invention, when the second timer is disposed in the microcomputer control unit and the two-phase pulse is generated from the pulse generator at the time of opening and closing the window, the set time in the timer is reset so as to be slightly longer than the specified pulse edge interval of the two-phase pulse each time the pulse edge in the two-phase pulse arrives. Consequently, when it is detected by using the set time in the second timer that the pulse edge interval between the arrival of one pulse edge in the two-phase pulse and the arrival of the next pulse edge has a specific length, only by resetting the second timer by the next pulse edge and setting the next second time of the timer, the microcomputer control unit can detect the pinching of an object by the power window apparatus as usual. On the other hand, when it is detected by the elapse of the set time of the second timer that the pulse edge interval is considerably longer than the specified length due to occurrence of a failure or fault in the pulse generator or its output transfer system, the microcomputer control unit immediately stops the detection of the pinching by the power window apparatus. Consequently, erroneous determination of the occurrence of the pinching in the state where nothing is actually pinched in the window can be avoided.

What is claimed is:

1. An apparatus for detecting pinching of an object in a power window comprising:

a motor for opening and closing a window via a window driving mechanism;

a motor driving unit for driving the motor;

a pulse generating unit for generating pulses corresponding to the rotation of the motor;

a microcomputer control unit for performing a whole control driving process; and a switching arrangement for opening and closing the window by manual operation;

wherein the microcomputer control unit for detecting a motor torque value from an interval between pulse edges of a pulse generated by the pulse generating unit when the window is opened or closed by driving the motor, comparing the detected motor torque value with a preset addition value, determining occurrence of the pinching of an object in the window when the motor torque value exceeds the addition value, and stopping or reversely rotating the motor, wherein a timer for newly setting time each time a pulse edge in the pulse arrives is disposed in the microcomputer control unit and the microcomputer control unit stops the determination of the presence or absence of the pinching of an object in the window when a pulse edge in the pulse arrives and the next pulse edge does not arrive within the set time in the timer.

2. An apparatus according to claim 1, wherein when the determination of the presence or absence of the pinching of an object in the window is stopped, the microcomputer control unit moves the window so as to be opened via the motor driving unit.

* * * * *